(12) United States Patent
Chan

(10) Patent No.: US 6,838,624 B2
(45) Date of Patent: Jan. 4, 2005

(54) WEIGHING SCALE

(75) Inventor: Raymond Chan, Hunghom (HK)

(73) Assignee: IDT Technology Limited, Kowloon (HK)

( * ) Notice: Subject to any disclaimer, the term of this patent is extended or adjusted under 35 U.S.C. 154(b) by 336 days.

(21) Appl. No.: 10/225,309

(22) Filed: Aug. 22, 2002

(65) Prior Publication Data

US 2004/0035610 A1 Feb. 26, 2004

(51) Int. Cl.$^7$ .............................................. G01G 23/01
(52) U.S. Cl. ........................... 177/50; 177/177; 73/1.13
(58) Field of Search .............................. 73/1.13; 177/50, 177/177, 256

(56) References Cited

U.S. PATENT DOCUMENTS

| | | | | |
|---|---|---|---|---|
| 3,693,739 A | * | 9/1972 | Kaloustian et al. | 177/214 |
| 4,082,153 A | * | 4/1978 | Provi | 177/177 |
| 5,610,373 A | * | 3/1997 | Graves et al. | 177/50 |
| 6,166,335 A | * | 12/2000 | Soehnle | 177/177 |
| 6,563,059 B2 | * | 5/2003 | Lee | 177/177 |

* cited by examiner

Primary Examiner—Randy W. Gibson
(74) Attorney, Agent, or Firm—Leydig, Voit & Mayer, Ltd.

(57) ABSTRACT

An electronic weighing scale includes a body for use on a horizontal surface for a weighing operation, a display on the body for displaying a measured weight, and an electronic weighing circuit in the body for measuring the weight of a person standing on the body. The weighing circuit includes a zero-reset circuit for resetting the measurement to zero prior to a weighing operation. The body includes a zero-reset member incorporating an electrical switch operable by the zero-reset member to trigger the zero-reset circuit. The zero-reset member engages the surface, when the body is placed on the surface, for operating the switch to trigger the zero-reset circuit.

12 Claims, 2 Drawing Sheets

WEIGHING SCALE

The present invention relates to an electronic weighing scale.

BACKGROUND OF THE INVENTION

Electronic weighing scales for personal health care are widely used. A typical weighing scale has a flat body including an electronic weighing circuit to measure and a display to indicate weight. For accuracy, the weighing circuit usually requires zero reset everytime before use, which in the case of most conventional scales is enabled by a press knob provided on one side of the scale body.

Zero reset is performed by a user briefly depressing the press knob using a finger or toe while the scale is standstill, whereupon the display will show a zero reading and the scale is ready for use. Zero reset in this manner is inconvenient, and if overlooked will also result in a wrong measurement.

The invention seeks to mitigate or at least alleviate such shortcomings by providing an improved electronic weighing scale.

SUMMARY OF THE INVENTION

According to the invention, there is provided an electronic weighing scale comprising a body for use on a horizontal surface for weighing operation, a display on the body for displaying a measured weight, and an electronic weighing circuit in the body for measuring the weight of a person standing on the body. The weighing circuit includes a zero-reset circuit for resetting the measurement to zero prior to weighing operation. The body includes a zero-reset member incorporating an electrical switch operable by the zero-reset member to trigger the zero-reset circuit. The zero-reset member is arranged to engage said surface when the body is placed thereon for operating the switch to trigger the zero-reset circuit.

Preferably, the zero-reset member protrudes substantially vertically downwards from the body.

More preferably, the body has a foot that comprises the zero-reset member.

In a preferred embodiment, the zero-reset foot is compressible in length, upon engaging said surface when the body is placed thereon, to operate the switch.

More preferably, the zero-reset foot includes an internal spring counteracting said compression.

In a preferred construction, the zero-reset foot has a multi-layered structure, comprising a first upper layer and a second lower layer between which the switch is provided, and a spring co-acting between the two layers, said layers being compressible to operate the switch.

More preferably, the zero-reset foot includes a third layer above the first layer, which has a periphery fixed relative to the body and a central portion engaging the first layer, said central portion being resiliently deformable upwards, when the first and second layers are compressed, to operate a load cell associated with the foot.

More preferably, the body has a second foot of substantially the same construction as the zero-reset foot, which incorporates a corresponding electrical switch operable through compression of the second foot to activate the weighing circuit subsequent to zero reset.

In a preferred construction, the switch comprises at least one fixed contact supported by one of the first and second layers and a movable contact supported by the other of the first and second layers, said movable contact being movable into contact with the fixed contact when the first and second layers are compressed.

Advantageously, the zero-reset circuit is arranged to perform zero reset repeatedly after the body has been placed on said surface for a predetermined period of time without operation, such that the scale is always ready for operation.

In a specific construction, the body has four feet for engaging said surface, each of which is associated with a respective load cell and is compressible in length to operate the load cell, one of the feet comprising the zero-reset member operable by the foot upon initial compression.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
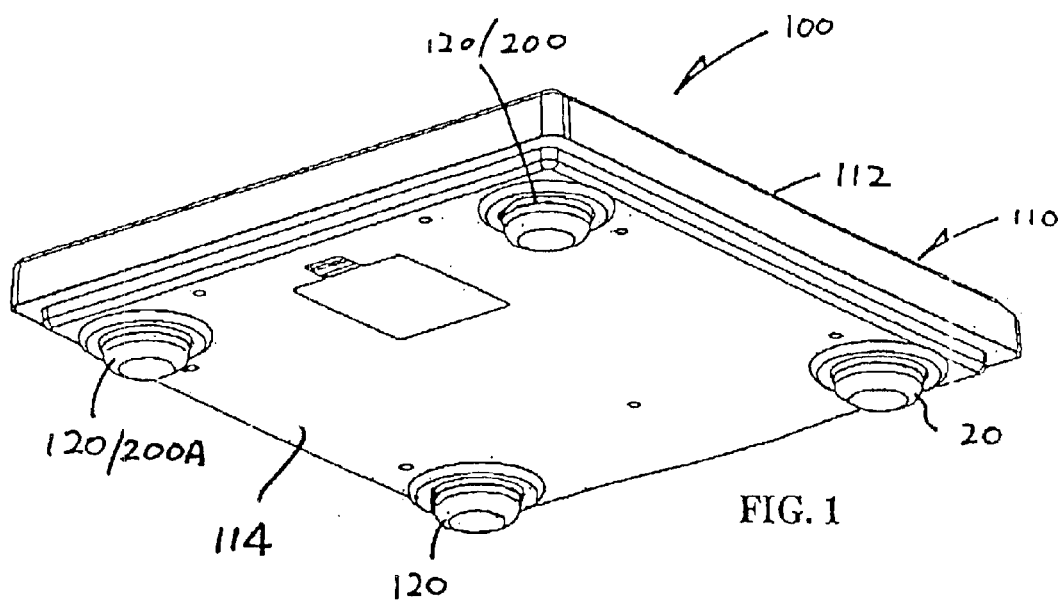
FIG. 1 is a bottom perspective view of an embodiment of an electronic weighing scale in accordance with the invention, the scale having four feet including a zero-reset foot.
Figure 2:
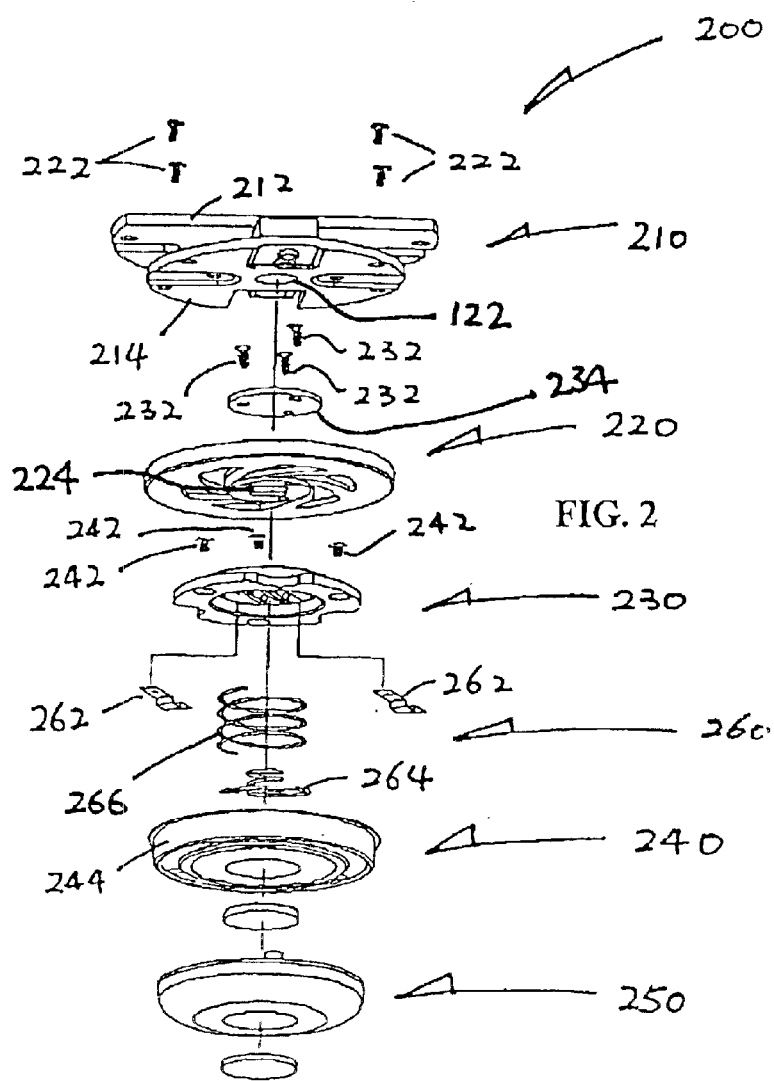
FIG. 2 is an exposed perspective view of the zero-reset foot of FIG. 1.

Referring to the drawings, there is shown an electronic weighing scale 100 embodying the invention, which scale 100 comprises a generally flat horizontal square body 110 provided with four short vertical feet 120 adjacent its corners respectively. The body 110 has a flat top casing 112, on the upper outer side of which an LCD display (not shown) is provided and on the lower inner side of which the feet 120 are mounted. The body 110 includes a flat bottom casing 114 fixed to the top casing 112. The bottom casing 114 is formed with four corner apertures through which the respective feet 120 extend from the top casing 112 downwardly out of the body 110.

The body 110 houses an electronic weighing circuit which includes four load cells (strain gauges) 122 and is calibrated to measure the weight of a user standing on the top casing 112 and then display the measured weight on the LCD display. The load cells 122 form part of the respective feet 120 to bear the weight of the user, and are adapted to provide corresponding output signals for calculation by the weighing circuit to produce a measurement indicative of the user's weight.

For accuracy, the weighing circuit requires zero offset or reset, i.e. resetting or adjusting the measurement to zero, at an initial no-load condition for subsequent weighing operation. One of the feet 120 is a zero-reset foot 200 to perform the zero reset action. The zero-reset foot 200 has a multi-layered structure, comprising from above a generally flat foot mount 210, an apertured buffer disc 220, a foot disc 230, a foot cap 240 and a foot cover 250, which are stacked co-axially together along a vertical axis. The foot mount 210 incorporates a respective load cell 122, which is accessible on the lower side of the mount 210.

The foot mount 210 has an upper plate 212 and an interconnected lower disc 214, with the upper plate 212 being secured from below to the top casing 112 by screws (not shown). The buffer disc 220 has generally the same size as the foot mount disc 214 and is fixed thereto underneath it by screws 222 at their peripheries. The arrangement is such that a central portion 224 of the buffer disc 220 is resiliently deformable upwards to bear against the load cell 122 by means of a small pressure disc 234 located thereon.

The foot disc 230 is relatively smaller than the buffer disc 220 and is secured to below the central portion 224 of the latter by screws 232, said screws 232 also securing the pressure disc 234 on the opposite upper side of the central portion 224. The foot cap 240 has a diameter between those of the buffer disc 220 and the foot disc 230, and is connected by peripheral screws 242 to and enclosing the foot disc 230 for limited vertical movement relative thereto. The foot cover 250 is fixed to below the foot cap 240.

The foot disc 230 and the foot cap 240 together form a slightly compressible unit 230/240 that is in turn connected to the central portion 224 of the buffer disc 220 for limited vertical movement relative to the foot mount 210. This results in the zero-reset foot 200 being slightly extendable and/or retractable relative to the scale body 110.

The zero-reset foot 200 incorporates a pressure-sensitive electrical switch 260 inside the compressible unit 230/240. The switch 260 comprises a pair of fixed contacts 262 located on the underside of the foot disc 230 and includes a movable contact spring 264 supported by and centrally within the foot cap 240. The contact spring 264 is normally spaced for a small vertical distance apart from both fixed contacts 262 by means of a soft compression coil spring 266. The coil spring 266 co-acts between the foot disc 230 and the foot cap 240, such that the switch 260 will only be closed (the contact spring 264 moving upwards into contact with both fixed contacts 262) when the unit 230/240 is subject to compression, i.e. the zero-reset foot 200 engaging the floor.

The pressure-sensitive switch 260 forms part of a zero-reset circuit included in the weighing circuit of the weighing scale 100, with its fixed contacts 262 electrically connected by wires to the zero-reset circuit.

The other three feet 120 have essentially the same construction and length as the zero-reset foot 200. In particular, one of the other feet 120 (designated by reference numeral 200A in FIG. 1) likewise incorporates a pressure-sensitive electrical switch similar to the aforesaid switch 260, but this switch is connected to an activation circuit of the weighing circuit for activating a weighing operation. The only structural difference of this switch lies in the use of a relatively shorter movable contact (corresponding to the aforesaid contact spring 264) such that the switch will be closed at a later time than the aforesaid switch 260 during operation. This ensures that the weighing circuit will be reset zero before it is activated to measure weight. With regard to the remaining two feet 120, they simply lack a switch equivalent to the aforesaid switch 260.

The four feet 120, including the zero-reset foot 200 and the activation foot 200A, preferably have the same length and identical associated coil springs 266, such that the scale body 110 will rest on the floor in a balanced horizontal position. Upon the weighing scale 100 being placed on the floor, all four feet 120 will be shortened by the same small amount through compression of the coil springs 266 or the compressible units 230/240. This results in closing of the switch 260 of the zero-reset foot 200 to perform zero reset of the weighing circuit.

Not until a user steps on the weighing scale 100, the switch of the activation foot 200A will remain open. When a user does so, this switch will be closed through further compression of the coil springs 266, thereby activating the weighing circuit. When the compressible units 230/240 can no longer be compressed, the central portions 224 of the buffer discs 220 will be stretched upwards to bear the pressure discs 234 against the corresponding load cells 122, whereupon the weighing circuit calculates and indicates a measurement on the LCD display.

The operation of the weighing scale 100 will now be described, which is usually left on the floor ready for use or has just been moved out from storage onto the floor for use. While the scale 100 is lying on the floor, the zero-reset foot 200 is always under compression closing the switch 260 and the zero-reset circuit is in continuous operation.

Figure 3:
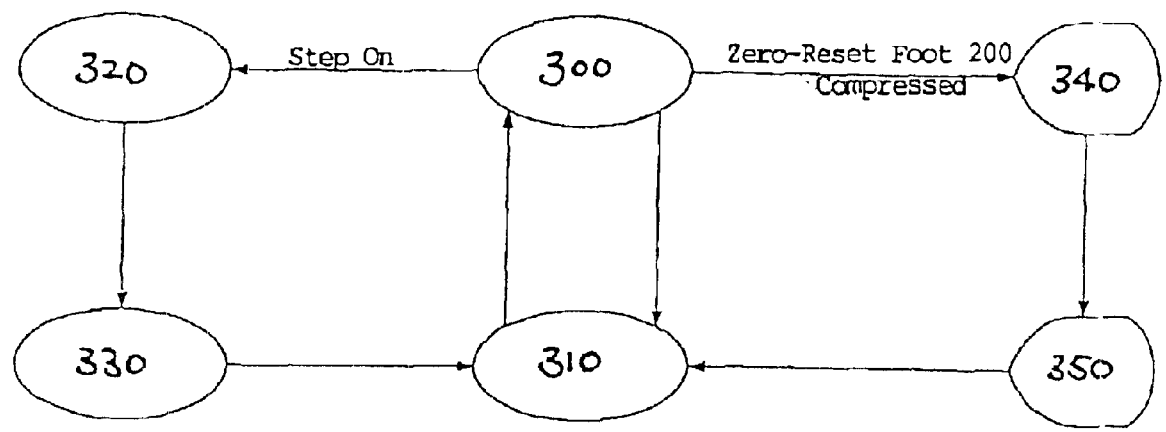
FIG. 3 is an operating flow diagram of the zero-reset foot of FIG. 2.

According to FIG. 3, the weighing scale 100 will be idling with its LCD display turned off when it is placed on a flat surface and not in use (box 300) for a predetermined period of time. During this condition, the zero-reset circuit will reset zero (box 310) repeatedly every 15 minutes according to a predetermined program or algorithm such that the scale 100 is always ready for operation. While the scale 100 is on the floor and as soon as a person steps and stands on it, the weighing circuit is activated into operation (box 320) and then indicates the measured weight on the LCD display (box 330).

If the weighing scale 100 has just been placed on the floor, the zero-reset foot 200 will be compressed, thereby triggering the zero-reset circuit with the LCD display initially displaying "888" (box 340). Two seconds later the LCD display will display "CAL" (box 350), and thereafter zero reset is completed (box 310) and the scale 100 is then ready for weight measurement.

The weighing scale 100 is powered by a battery, and may include a low-battery detection circuit for displaying an alert icon on the LCD display when the battery is running low.

The zero-reset foot 200 is in effect a sensor that detects the operating position of the weighing scale 100, i.e. being placed on the floor, in which the scale 100 is ready for weighing.

It is envisaged that the zero-reset function of the foot 200 may instead be performed by an actuator that does not act as a foot as such. The actuator may protrude out from the bottom of the weighing scale for engaging the floor when the scale is placed on the floor.

The invention has been given by way of example only, and various other modifications of and/or alterations to the described embodiment may be made by persons skilled in the art without departing from the scope of the invention as specified in the appended claims.

What is claimed is:

1. An electronic weighing scale comprising:
    a body for use on a horizontal surface for a weighing operation,
    a display on the body for displaying a measured weight, and
    an electronic weighing circuit in the body for measuring weight of a person standing on the body, wherein
        the weighing circuit includes a zero-reset circuit for resetting the weight to zero prior to a weighing operation,
        the body includes a zero-reset member incorporating an electrical switch operable by the zero-reset member to trigger the zero-reset circuit, and
        the zero-reset member engages the horizontal surface, when the body is placed on the horizontal surface, for operating the switch to trigger the zero-reset circuit.

2. The electronic weighing scale as claimed in claim 1, wherein the zero-reset member protrudes from and substantially perpendicular to the body.

3. The electronic weighing scale as claimed in claim 2, wherein the zero-reset member comprises a first foot on the body.

4. The electronic weighing scale as claimed in claim 3, wherein the first foot is compressible in length, upon engaging the horizontal surface, when the body is placed on the surface, to operate the switch.

5. The electronic weighing scale as claimed in claim 4, wherein the first foot includes an internal spring counteracting compression of the zero-reset foot.

6. The electronic weighing scale as claimed in claim 3, wherein the first foot has a multi-layered structure, comprising a first upper layer and a second lower layer between which the switch is located, and a spring co-acting between the first and second layers, the first and second layers being compressible to operate the switch.

7. The electronic weighing scale as claimed in claim 6, wherein the first foot includes a third layer, which has a periphery fixed relative to the body and a central portion engaging the first layer, the central portion being resiliently deformable, when the first and second layers are compressed, to operate a load cell associated with the first foot.

8. The electronic weighing scale as claimed in claim 6, wherein the body has a second foot of substantially the same construction as the first foot, which incorporates a corresponding electrical switch operable through compression of the second foot to activate the weighing circuit subsequent to zero reset.

9. The electronic weighing scale as claimed in claim 7, wherein the body has a second foot of substantially the same construction as the first foot, which incorporates a corresponding electrical switch operable through compression of the second foot to activate the weighing circuit subsequent to zero reset.

10. The electronic weighing scale as claimed in claim 6, wherein the switch comprises at least one fixed contact supported by one of the first and second layers and a movable contact supported by the other of the first and second layers, the movable contact being movable into contact with the fixed contact when the first and second layers are compressed.

11. The electronic weighing scale as claimed in claim 1, wherein the zero-reset circuit resets repeatedly after the body has been placed on the horizontal surface for a predetermined period of time without operation, so that the scale is always ready for operation.

12. The electronic weighing scale as claimed in claim 1, wherein the body has four feet for engaging the horizontal surface, each feet being associated with a respective load cell and compressible in length to operate the load cell, and the zero-reset member comprises one of the feet operable by the foot upon compression.

* * * * *